US008059564B2

(12) United States Patent
Park et al.

(10) Patent No.: US 8,059,564 B2
(45) Date of Patent: Nov. 15, 2011

(54) METHOD AND SYSTEM FOR TERMINAL CODEC SETUP OF MULTIMEDIA RING BACK TONE SERVICE

(75) Inventors: Seongsoo Park, Seoul (KR); Donghahk Lee, Seongnam-si (KR); Wonsuk Chung, Seoul (KR); Seongkeun Kim, Seoul (KR); Heehyeok Hahm, Seoul (KR); Sehyun Oh, Seoul (KR); Myungsung Lee, Seoul (KR)

(73) Assignee: SK Telecom Co., Ltd. (KR)

( * ) Notice: Subject to any disclaimer, the term of this patent is extended or adjusted under 35 U.S.C. 154(b) by 1344 days.

(21) Appl. No.: 11/571,987

(22) PCT Filed: Jul. 8, 2005

(86) PCT No.: PCT/KR2005/002200
§ 371 (c)(1),
(2), (4) Date: Jan. 11, 2007

(87) PCT Pub. No.: WO2006/006801
PCT Pub. Date: Jan. 19, 2006

(65) Prior Publication Data
US 2008/0043642 A1 Feb. 21, 2008

(30) Foreign Application Priority Data
Jul. 12, 2004 (KR) .................. 10-2004-0054040

(51) Int. Cl.
H04L 12/16 (2006.01)
H04M 3/42 (2006.01)
(52) U.S. Cl. ..................... 370/259; 455/414.1
(58) Field of Classification Search ............ 455/414.1, 455/458; 370/259; 379/210.01
See application file for complete search history.

(56) References Cited

U.S. PATENT DOCUMENTS
2004/0120494 A1*  6/2004  Jiang et al. ............... 379/210.01
2006/0264225 A1* 11/2006  No et al. ....................... 455/458

FOREIGN PATENT DOCUMENTS
JP    6-296202     10/1994
JP    2001-7924    1/2001
JP    2001-077947  3/2001
JP    2003-274016  9/2003

* cited by examiner

Primary Examiner — Lester Kincaid
Assistant Examiner — Kuo Woo
(74) Attorney, Agent, or Firm — Baker & Hostetler LLP

(57) ABSTRACT

Disclosed is a method and a system for setup of a multimedia codec and a voice codec between a mobile phone system and a terminal, in providing a multimedia RBT service capable of operating a multimedia codec allowing high quality music playback during an RBT interval and operating a voice codec such as an Enhanced Variable Rate Codec (Hereinafter, referred to as EVRC) during voice communication when an originating terminal supports the multimedia codec capable of improving the music quality in addition to a dedicated voice codec such as the EVRC.

24 Claims, 4 Drawing Sheets

METHOD AND SYSTEM FOR TERMINAL CODEC SETUP OF MULTIMEDIA RING BACK TONE SERVICE

FIELD OF THE INVENTION

The present invention relates to a method and a system for terminal codec setup of a multimedia Ring Back Tone (Hereinafter, referred to as RBT) service. More particularly, the present invention relates to a method and a system for setup of a multimedia codec and a voice codec between a mobile phone system and a terminal, in providing a multimedia RBT service capable of operating a multimedia codec allowing high quality music playback during an RBT interval and operating a voice codec such as an Enhanced Variable Rate Codec (Hereinafter, referred to as EVRC) during voice communication when an originating terminal supports the multimedia codec capable of improving the music quality in addition to a dedicated voice codec such as the EVRC.

BACKGROUND OF THE INVENTION

With the rapid development of computer, electronic and communication technology, various wireless communication services using a wireless network have been provided. The most basic wireless communication service is a wireless voice communication service for providing voice communication to mobile communication terminal users in wireless manner, which has a characteristic of providing the service to the users regardless of time and place. Further, the wireless communication service supplements a voice communication service with a text message service. Recently, a wireless Internet service has emerged, which provides an Internet communication service to mobile communication terminal users through a wireless network.

Accordingly, subscribers of a mobile communication service can not only communicate with partners by using a wireless communication service regardless of time and place while freely moving here and there, but also receive various information, such as news, weather, sports, stocks, exchange rates and traffic information, in the form of texts, voice, images, etc.

With the development of mobile communication technology as described above, services provided by a Code Division Multiple Access (Hereinafter, referred to as CDMA) mobile communication system have been developed from voice services to multimedia communication services for transmitting data such as circuit and packet data.

Recently, with the development of information communication, an International Mobile Telecommunication (Hereinafter, referred to as IMT)-2000, e.g., a CDMA 2000 1X, 3X, EV-DO or a Wideband COMA (WCDMA), has been commercialized, which is the $3^{rd}$ mobile communication system and has been established as a standard by an International Telecommunication Union Recommendation (ITU-R). Further, a wireless Internet service has been provided at a transmission speed of 307.2 Kbps at maximum far faster than 14.4 Kbps or 56 Kbps, which is a data transmission speed supported by an Interim Standard (Hereinafter, referred to as IS)-95A network or an IS-95B network, by using an IS-95C network evolved from the existing IS-95A network and IS-95B network. In particular, an IMT-2000 service is used, so that the quality of an existing voice and Wireless Application Protocol (WAP) service can be improved and various multimedia services, e.g., Audio On Demand (AOD), Video On Demand (VOD), etc., can be provided at higher speed.

Recently, an RBT service or a so-called coloring RBT service has been highlighted, in which various sounds customized by the user of a call-receiving mobile communication terminal are outputted to a mobile communication terminal or a general telephone of a calling party as RBTs. This RBT service includes a concept for RBTs designated by a called party to be provided to a calling party. That is, the RBT service is a service in which the newest Korean songs, pop songs, a recorded voice, bird or water sounds, etc., can be used as RBTs instead of existing mechanical RBTs, e.g., "ring, ring" sound, occurring during ordinary communication.

The RBT service as described above has been provided, so that a partner can listen to sounds of a sound source customized by a called party instead of uniform and mechanical RBTs. Therefore, the partner can obtain auditory satisfaction.

Most mobile communication terminals use a voice codec having a variable rate such as an EVRC for the efficiency of voice communication and the optimization of radio channels. The EVRC is a codec for variably coding voice information according to the amount of voice information. That is, the EVRC encodes voice at a low rate during no-sound interval in which speakers do not output sound and encodes voice at high speed when the amount of information is large. It may be understood that this EVRC is an efficient codec as compared with existing codecs for always encoding voice at constant speed. The EVRC is used, so that the system capacity of a CDMA mobile communication system can increase and power consumption can also be minimized.

However, a voice codec having a variable rate such as this EVRC may deteriorate the sound quality for music, such as background sounds having nearly no-sound interval, due to a variable rate coding error. In order to overcome this problem, music service providers have made efforts to minimize the loss of sound sources due to a voice codec by extracting the sound sources and correcting the sound sources according to the EVRC. This sound source correction has depended on pre-processing considering the characteristics of the EVRC or manual operation of a sound specialist.

These processes may improve the quality of the music service through the EVRC nearly up to the level of the voice quality, but it is difficult to improve the quality of the music service because a voice codec has been designed to be suitable for voice communication. Therefore, most high quality music services currently being provided separately use high quality multimedia codecs and provide music through data channels instead of voice channels. Herein, most of these commercialized multimedia service codecs have required transmission speeds over 16 K. Therefore, these are unsuitable for application to a voice channel providing a rate of about 8 K. Accordingly, most music services using these multimedia service codecs provide realtime services by using data channels for ensuring a data rate over 16 K or provide services after downloading music files through a download service.

In order to provide a multimedia service for an RBT service using these voice channels, it is indispensable to develop a multimedia codec with a rate of 8 K and provide a mobile communication system and a terminal capable of providing the multimedia service. Herein, the multimedia codec with the rate of 8 K may be developed by reducing a sampling rate from the current multimedia codec standard. However, revision of a mobile communication system and a mobile communication terminal is unavoidable in order to provide the multimedia service.

SUMMARY OF THE INVENTION

Therefore, the present invention has been made in view of the above-mentioned problems, and it is an object of the present invention to provide a method and a system for setup of a multimedia codec and a voice codec between a mobile phone system and a terminal, in providing a multimedia RBT service capable of operating a multimedia codec allowing high quality music playback during an RBT interval and operating a voice codec such as an Enhanced Variable Rate Codec (Hereinafter, referred to as EVRC) during voice communication when an originating terminal supports the multimedia codec capable of improving the music quality in addition to a dedicated voice codec such as the EVRC.

According to one aspect of the present invention, there is provided a method for providing terminal codec setup for use in a multimedia Ring Back Tone (RBT) service, wherein the RBT service allows an RBT sound source previously set in a sound source-providing server by a called subscriber to be reproduced to an originating terminal, by using a Home Location Register (HLR) and the sound source-providing server for storing RBT sound sources when a calling subscriber places a call to the called subscriber, the HLR storing profile information including whether the subscriber has is subscribed to the RBT service, the method comprising the steps of (a) receiving a first codec setup message including multimedia codec information from the called subscriber, after an ISDN User Part (ISP) call connection request message including the multimedia codec information is transmitted to the called subscriber; (b) when the first codec setup message is received, transmitting a second codec setup message for requesting setup of a multimedia codec to a caller-side Base Transceiver Station (BTS), to thereby control a caller-side vocoder installed in a caller-side Base Station Controller (BSC) to set up the multimedia codec; (c) when the first codec setup message is received, transmitting a third codec setup message for requesting setup of the multimedia codec to the originating terminal, to thereby control the originating terminal to set up the multimedia codec; and (d) receiving the RBT sound source selected by using the multimedia codec information from the sound source-providing server and transmitting the RBT sound source to the originating terminal.

According to another aspect of the present invention, there is provided a system for providing terminal codec setup for use in a multimedia Ring Back Tone (RBT) service, wherein the RBT service allows an RBT sound source previously set in a sound source-providing server by a called subscriber to be reproduced to an originating terminal, by using a Home Location Register (HLR) and the sound source-providing server for storing RBT sound sources when a calling subscriber places a call to the called subscriber, the HLR storing profile information including whether the subscriber is subscribed to the RBT service, the system comprising: a caller-side switching center for receiving a first codec setup message including multimedia codec information from the called subscriber after an ISDN User Part (ISUP) call connection request message including the multimedia codec information is transmitted to the called subscriber, transmitting a second codec setup message for requesting setup of the multimedia codec to a caller-side Base Transceiver Station (BTS) in order to control a caller-side vocoder to set up the multimedia codec, and transmitting a third codec setup message for requesting setup of the multimedia codec to the originating terminal in order to control the originating terminal to set up the multimedia codec; and a caller-side BSC for setting the multimedia codec by using the multimedia codec information included in the second codec setup message when the second codec setup message is received from the caller-side switching center.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENTS

Figure 1:
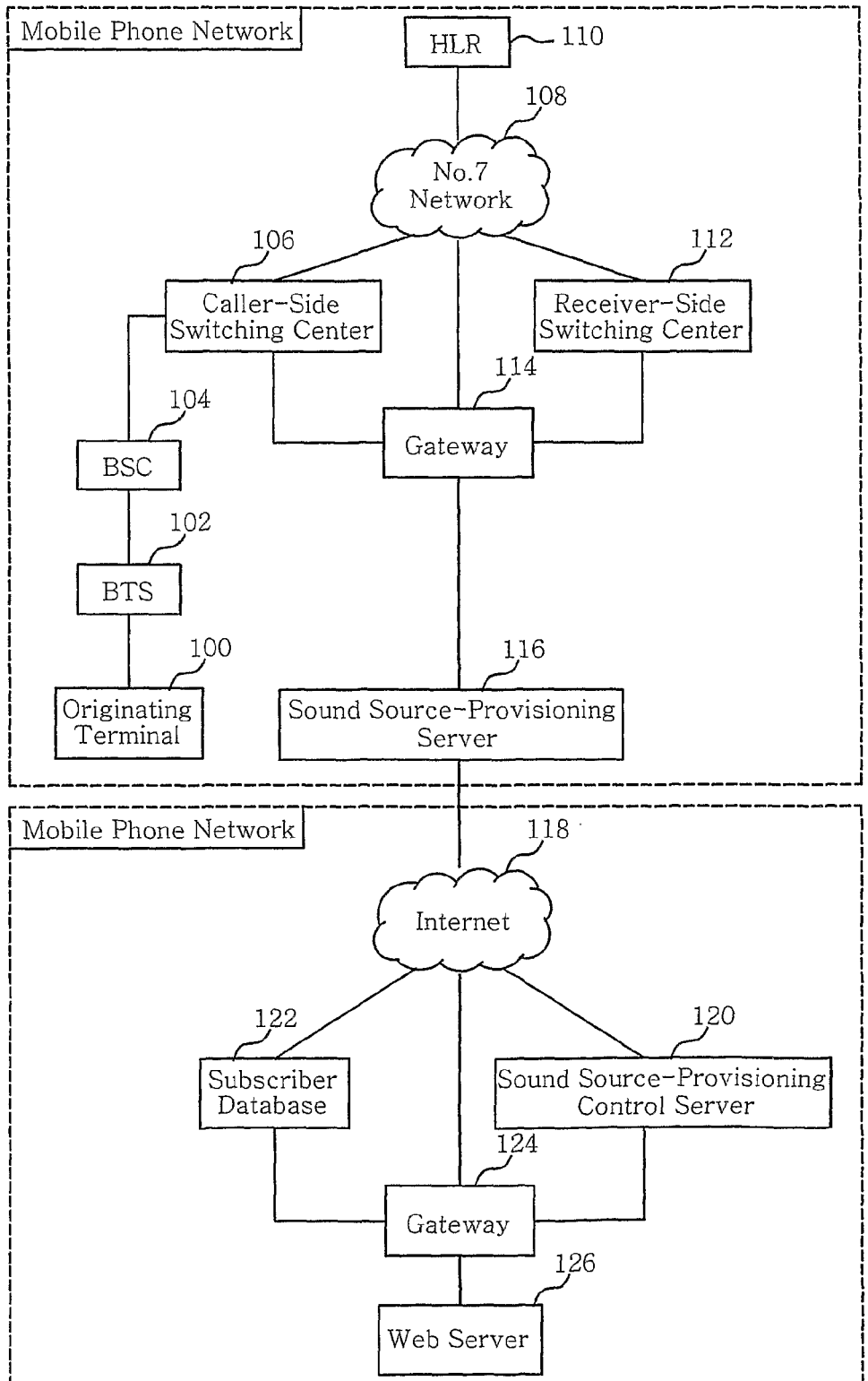
FIG. 1 is a block diagram schematically illustrating the construction of a system for providing a multimedia RBT service according to a preferred embodiment of the present invention.

Reference will now be made in detail to the preferred embodiment of the present invention. The same reference numerals are used to designate the same elements as those shown in other drawings. In the following description of the present invention, a detailed description of known configurations and functions incorporated herein will be omitted when it may make the subject matter of the present invention rather unclear.

FIG. 1 is a block diagram schematically illustrating the construction of a system for providing a multimedia RBT service according to a preferred embodiment of the present invention.

As illustrated in FIG. 1, the system for providing the multimedia RBT service according to the preferred embodiment of the present invention may include an originating terminal 100, a Base Transceiver Station (Hereinafter, referred to as BTS) 102, a Base Station Controller (Hereinafter, referred to as BSC) 104, a caller-side switching center 106, a No. 7 network 108, a Home Location Register (Hereinafter, referred to as HLR) 110, a receiver-side switching center 112, gateways 114 and 124, a sound source-providing server 116, the Internet 118, a sound source-providing control server 120, a subscriber database 122, a web server 126, etc.

Hereinafter, each element will be briefly described. The HLR 110 includes subscriber information and communicates with the caller-side switching center 106 and the receiver-side switching center 112 via the No. 7 network 108 based on a Signaling Transfer Protocol (STP). The caller-side switching center 106 and the receiver-side switching center 112 are connected to the sound source-providing server 116 for storing sound sources through the gateway 114. Further, the caller-side switching center 106 and the receiver-side switching center 112 are connected to the BSC 104 in order to support access for mobile communication. The BSC 104 communicates with a user terminal and takes charge of source allocation and vocoder control for voice communication channels. The sound source-providing server 116 is connected to the subscriber database 122 and the sound source-providing control server 120 through the Internet 118.

Hereinafter, main elements according to the preferred embodiment of the present invention will be described in more detail.

The originating terminal 100 according to the preferred embodiment of the present invention is a terminal capable of performing voice communication and image communication for a partner through a mobile communication network and performing data communication through wireless Internet connection. Further, the originating terminal 100 according to the preferred embodiment of the present invention supports an H.245 for a call control, an H.245 for a call setup and a call signaling, an audio codec and a video codec. That is, the originating terminal 100 is a terminal capable of receiving a music service, etc., through voice communication channels by using a multimedia codec other than an EVRC for voice communication. Accordingly, when RBT sound sources are received, the originating terminal 100 according to the preferred embodiment of the present invention reproduces the received sound sources by using a multimedia codec according to the sound sources.

For example, the multimedia codec may include an Advanced Audio Coding (Hereinafter, referred to as AAA) codec, etc. The AAA employs a voice compression scheme, has been used for a music distribution service using the Internet, etc., and has also been generally used for MP3, Adaptive Transform Acoustic Coding (ATRAC 3), etc. The AAA has a compression rate higher than MP3, but the quality of sound is relatively bad. Accordingly, the AAA is proper for music distribution using personal communication system (telephone), etc.

The BTS 102 according to the preferred embodiment of the present invention is a network endpoint equipment for directly inter-working with a terminal by performing a baseband signal processing, a wire/wireless conversion, transmission/reception of radio signals, etc. The BTS 102 receives a call trial to a terminating terminal from the originating terminal 100 through a traffic channel of signals channels, and transmits the received call trial to the caller-side BSC 104.

The BSC 104 according to the preferred embodiment of the present invention controls the BTS 102, and performs radio channel allocation and release for a terminal, transmit power control of a terminal and the BTS 102, determination of inter-cell soft handoff and hard handoff, a transcoding, a vocoding, a Global Positioning System (GPS) clock distribution, operation and maintenance for the BTS 102, etc.

When a second codec setup message for setting a multimedia codec is received from the caller-side switching center 106, the BSC 104 according to the preferred embodiment of the present invention sets up the multimedia codec by using multimedia codec information included in the second codec setup message.

In a case where the mobile communication system supports the multimedia codec according to the preferred embodiment of the present invention, when a vocoder setup request is received from the receiver-side switching center 112, a vocoder installed in the BSC 104 encodes RBT sound sources by the multimedia codec and transmits the encoded RBT sound sources to the originating terminal 100. For this, the multimedia codec is provided to the BSC 104 by using hardware or software.

Each of the switching centers 106 and 112 according to the preferred embodiment of the present invention performs a control function for an efficient operation of a mobile communication network and a switching function for a communication request of the originating terminal 100. That is, each of the switching centers 106 and 112 performs a processing function for basic and supplementary services of a terminal, a processing function for incoming and originating calls of a subscriber, a location registration procedure, a handoff procedure processing function, an inter-working function with another network, etc. Each of the switching centers 106 and 112 of an IS-95 A/B/C system includes an Access Switching Subsystem (ASS) for performing a distributed call processing function, an Interconnection Network Subsystem (INS) for performing a centralized call processing function, a Central Control Subsystem (CCS) for taking charge of a centralization function of operation and preservation, a Location Registration Subsystem (LRS) for performing storage and maintenance function of information for mobile subscribers, etc. Further, each of the switching centers 106 and 112 for the 3$^{rd}$ and the 4$^{th}$ generation may include an Asynchronous Transfer Mode (Hereinafter, referred to as ATM) switch. The ATM switch transmits packets by the cell, thereby improving the transmission speed and the efficiency of a circuit use.

When the originating terminal 100 attempts a call connection to a terminating terminal, the caller-side switching center 106 according to the preferred embodiment of the present invention receives information regarding whether the terminating terminal is subscribed to an RBT service, and information (multimedia codec information) regarding the multimedia codec supported by the originating terminal 100 from the HLR 110. When the terminating terminal is subscribed to the RBT service, the caller-side switching center 106 transmits an ISDN User Part (ISUP) call connection request message including the multimedia codec information to the sound source-providing server 116, receives RBT sound sources convertible by the multimedia codec from the sound source-providing server 116, and transmits the received RBT sound sources to the originating terminal 100 via the BTS 102 and the BSC 104.

Herein, when the caller-side switching center 106 transmits the ISUP call connection request message including the multimedia codec information to a called subscriber-side, the called subscriber-side transmits a first codec setup message including the multimedia codec information to the caller-side switching center 106. Then, the caller-side switching center 106 transmits the second codec setup message for requesting setup of the multimedia codec to the caller-side BSC 104, thereby controlling the caller-side BSC 104 to set up the multimedia codec. Further, the caller-side switching center 106 transmits a third codec setup message for requesting setup of the multimedia codec to the originating terminal 100, thereby controlling the originating terminal 100 to set up the multimedia codec.

For this, each of the switching centers 106 and 112 according to the preferred embodiment of the present invention communicates with the HLR 110 when location registration of a subscriber is performed, and stores the information regarding whether the subscriber is subscribed to the RBT service, and information for routing to the sound source-providing server 116.

After transmitting the ISUP call connection request message to the sound source-providing server 116, the caller-side switching center 106 requests the BTS 102 and the originating terminal 100 to set up the multimedia codec, and activates a routing path for the RBT service.

When a call is terminated in the terminating terminal, the receiver-side switching center 112 transmits call termination signals and codec setup change request signals for voice communication of the terminating terminal to the caller-side switching center 106. When the call termination signals are received from the receiver-side switching center 112, the caller-side switching center 106 releases an ISUP call connection with the sound source-providing server 116. Further, when the codec setup change request signals are received from the receiver-side switching center 112, the caller-side switching center 106 requests the BTS 102 and the originating terminal 100 to change a codec setup and allows voice communication to be performed.

The HLR 110 according to the preferred embodiment of the present invention performs functions of recognizing or deleting the registration of a terminal, checking the location of the terminal, etc. Further, the HLR 110 stores profile information including whether a subscriber is subscribed to an RBT service, information for routing to the sound source-providing server 116, and multimedia codec information supported by a subscriber terminal. The multimedia codec information supported by the subscriber terminal is stored as supplementary service subscription information of an originating subscriber profile.

If the multimedia codec supported by the originating terminal 100 is a codec other than the EVRC, and the mobile communication system does not support the multimedia codec according to the preferred embodiment of the present invention, a control message for controlling the RBT sound sources to pass through the caller-side vocoder is transmitted to the caller-side switching center 106 from the receiver-side switching center 112. If the mobile communication system supports the multimedia codec according to the preferred embodiment of the present invention, the receiver-side switching center 112 transmits the received the ISUP call connection request message to the sound source-providing server 116, and receives the RBT sound sources from the sound source-providing server 116 and transmits a vocoder setup request for the multimedia codec to the caller-side vocoder.

The sound source-providing server 116 according to the preferred embodiment of the present invention stores the RBT sound sources. Accordingly, when the ISUP call connection request message is received from the receiver-side switching center 112, the sound source-providing server 116 transmits an RBT sound source selected using the multimedia codec information included in the ISUP call connection request message to the receiver-side switching center 112.

When the mobile communication system does not support the multimedia codec according to the preferred embodiment of the present invention, the sound source-providing server 116 stores various sound sources encoded according to the codec types applicable to the user terminal. However, when the mobile communication system supports the multimedia codec according to the preferred embodiment of the present invention, the sound source-providing server 116 stores various sound sources according to the codec types applicable to the user terminal, the sound sources not being encoded.

This source-providing server 116 connects to the switching centers 106 and 112 through the gateway 114, and provides a sound source proper for the codec type required by the switching centers 106 and 112.

Further, the sound source-providing server 116 according to the preferred embodiment of the present invention generates sound source code request signals including the multimedia codec information received from the caller-side switching center 106, and transmits the generated sound source code request signals to the sound source-providing control server 120. Further, the sound source-providing server 116 provides the caller-side switching center 106 with RBT sound sources searched using RBT sound source codes received from the sound source-providing control server 120. The sound source code request signals include the multimedia codec information, identification information of the terminating terminal, identification information of the originating terminal 100, call request time zone information, etc.

The sound source-providing control server 120 according to the preferred embodiment of the present invention communicates with the sound source-providing server 116 through the Internet 118. When the sound source code request signals including the multimedia codec information are received from the sound source-providing server 116, the sound source-providing control server 120 searches for the RBT sound source codes convertible by the multimedia codec and transmits the searched RBT sound source codes to the sound source-providing server 116. The RBT sound source codes are separately stored in the sound source-providing control server 120 according to each multimedia codec, each specific caller, each caller group, each originating time.

The web server 126 according to the preferred embodiment of the present invention is connected to the sound source-providing server 116 or the sound source-providing control server 120 through the Internet 118, adds sound sources to be stored in the sound source-providing server 116, or provides the sound source-providing control server 120 with information for specifying sound sources and a wire/wireless web page for changing RBT sound source codes corresponding to this information. The information for specifying the sound sources may include specific caller information, caller group information, or an originating time zone, etc.

Figure 2:
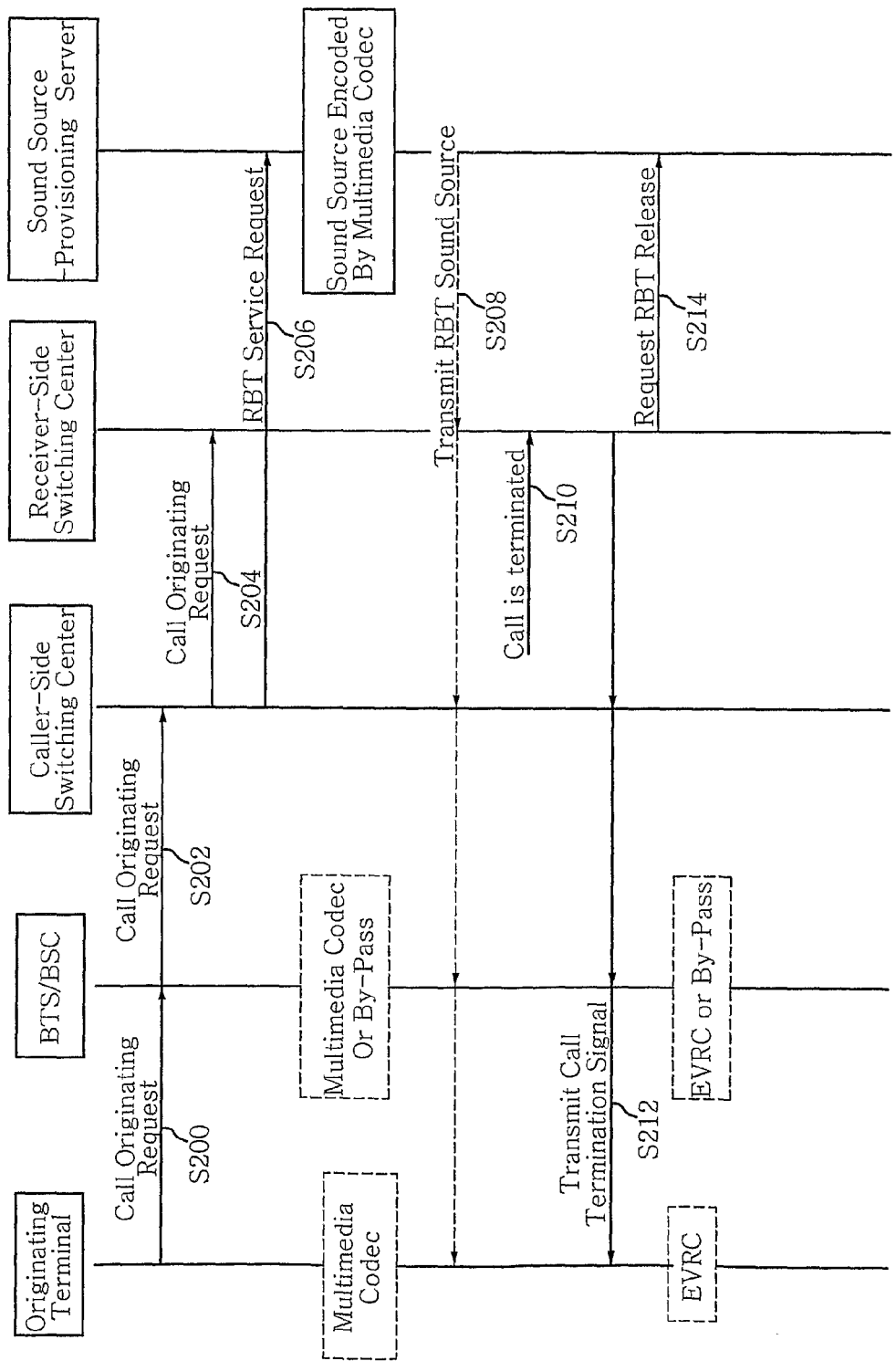
FIG. 2 is a flow diagram schematically illustrating a process for providing a multimedia RBT service according to a preferred embodiment of the present invention.

FIG. 2 is a flow diagram schematically illustrating a process for providing the multimedia RBT service according to a preferred embodiment of the present invention.

When the originating terminal 100 including a multimedia codec transmits a call originating request to the BTS 102 and the BSC 104 (S200), the BTS 102 and the BSC 104 transfer the call originating request to the caller-side switching center 106 (S202). The caller-side switching center 106 transmits a call connection request to the receiver-side switching center 112 (S204) and simultaneously transmits an RBT service request to the sound source-providing server 116 (S206).

As described above, the sound source-providing server 116 stores the RBT sound sources according to the multimedia codec used in the originating terminal 100, and transmits the RBT sound sources to the originating terminal 100 through the receiver-side switching center 112 and the caller-side switching center 106 (S208).

Herein, When the mobile communication system does not support the multimedia codec according to the preferred embodiment of the present invention, the RBT sound sources transferred from the sound source-providing server 116 are bypassed because the RBT sound sources are previously encoded sound sources. However, when the mobile communication system supports the multimedia codec according to the preferred embodiment of the present invention, the vocoder installed in the caller-side BSC 104 encodes the received sound sources by the multimedia codec and transmits the encoded sound sources to the originating terminal 100.

The originating terminal 100 reproduces the received RBT sound sources by using the multimedia codec. Then, when a call is terminated in the terminating terminal (S210), the receiver-side switching center 112 transmits call termination signals for reporting the call termination to the caller-side switching center 106 (S212). Further, the caller-side switching center 106 having received the call termination signals from the receiver-side switching center 112 requests the sound source-providing server 116 to release an RBT (S214), and controls a vocoder of the BSC 104 and a voice codec of the originating terminal 100 in order to perform voice communication.

Figure 3:
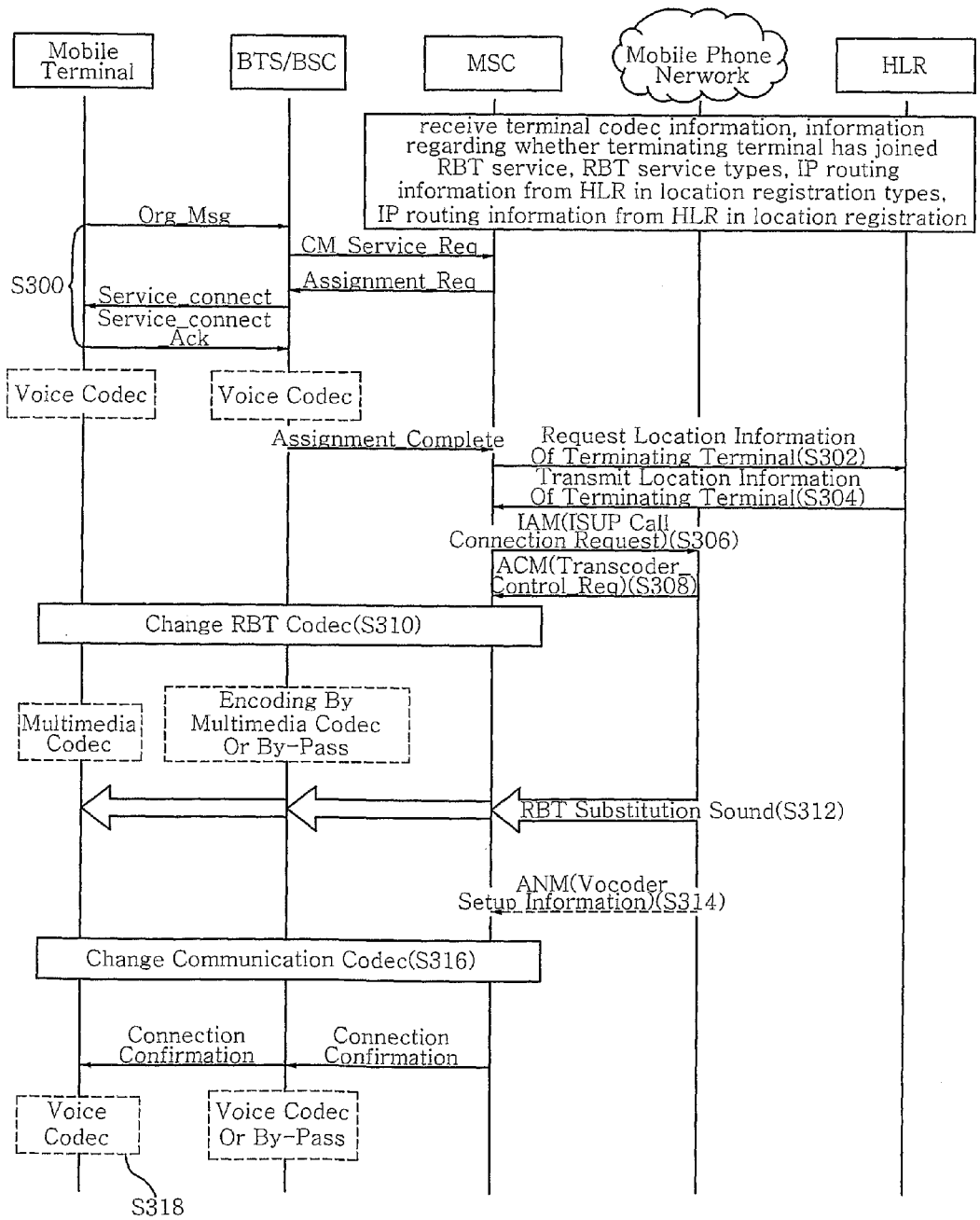
FIG. 3 is a flow diagram illustrating, in detail, a process for providing a multimedia RBT service according to a preferred embodiment of the present invention.

FIG. 3 is a flow diagram illustrating, in detail, a process for providing the multimedia RBT service according to a preferred embodiment of the present invention.

When the originating terminal 100 attempts a call connection to a terminating terminal, the caller-side switching center 106 performs radio resource allocation, channel allocation and vocoder allocation for the BSC 104 (S300). The BSC 104 performs a negotiation for a service with the originating terminal 100 through the BTS 102. In this process, the originating terminal 100 informs the BSC 104 of voice codec information used in voice communication, and the BSC 104 performs voice codec setup and voice communication channel allocation. Through this process, codec synchronization is accomplished between the originating terminal 100 and the mobile communication network. The BSC 104 notifies the caller-side switching center 106 of the voice communication channel allocation.

When the caller-side radio call setup is completed, the caller-side switching center 106 requests the HLR 110 to transmit location information of the terminating terminal (S302). The HLR 110 transmits the location information of the terminating terminal to the caller-side switching center 106 (S304). Herein, the caller-side switching center 106 also receives information regarding whether the terminating terminal is subscribed to the RBT service, and information regarding the multimedia codec supported by the originating terminal 100 together with the location information of the terminating terminal.

The caller-side switching center 106 transmits the ISUP call connection request message to the mobile phone network in order to report that there is a call out request for the terminating terminal by using an IAM message (S306). The ISUP call connection request message includes the information regarding the multimedia codec supported by the originating terminal 100.

Then, in the caller-side, a terminal codec setup process for changing a codec for the RBT is performed (S310).

When the mobile communication system does not support the multimedia codec according to the preferred embodiment of the present invention, the receiver-side switching center 112 transmits a codec setup request to the caller-side switching center 106 by using the multimedia codec for bypassing of the caller-side vocoder. The caller-side switching center 106 having received the codec setup request requests the BSC 104 and the originating terminal 100 to perform the codec setup so that an RBT through the multimedia codec can be provided, receives a response for the codec setup request, and then activates routing paths for the RBT.

However, in a case where the mobile communication system supports the multimedia codec according to the preferred embodiment of the present invention, when the receiver-side switching center 112 transmits a codec change request to the caller-side switching center 106, the caller-side switching center 106 requests the caller-side vocoder to perform vocoder setup for the RBT service and also requests the originating terminal 100 to perform vocoder change for the RBT service. Then, the caller-side switching center 106 receives responses for the requests and activates routing paths for the RBT. Further, messages exchanged in these processes will be described in detail with reference to FIG. 4.

The RBT sound source is transferred from the sound source-providing server 116 to the originating terminal 100 via the receiver-side switching center 112, the caller-side switching center 106, the BSC 104 and the BTS 102 until the call is terminated in the terminating terminal (S312).

When the call is terminated in the terminating terminal, the receiver-side switching center 112 transmits codec setup change request signals to the caller-side switching center 106 so that the codec can normally operate for voice communication of the terminating terminal, together with call termination signals for reporting the call termination (S314). A process from this step is a process (S316) for change to a codec for voice communication, and this will be described in detail with reference to FIG. 4.

When these call termination signals are received from the receiver-side switching center 112, the caller-side switching center 106 requests the vocoder installed in the BSC 104 to change the codec setup. Therefore, normal voice communication can be performed (S318).

Figure 4:
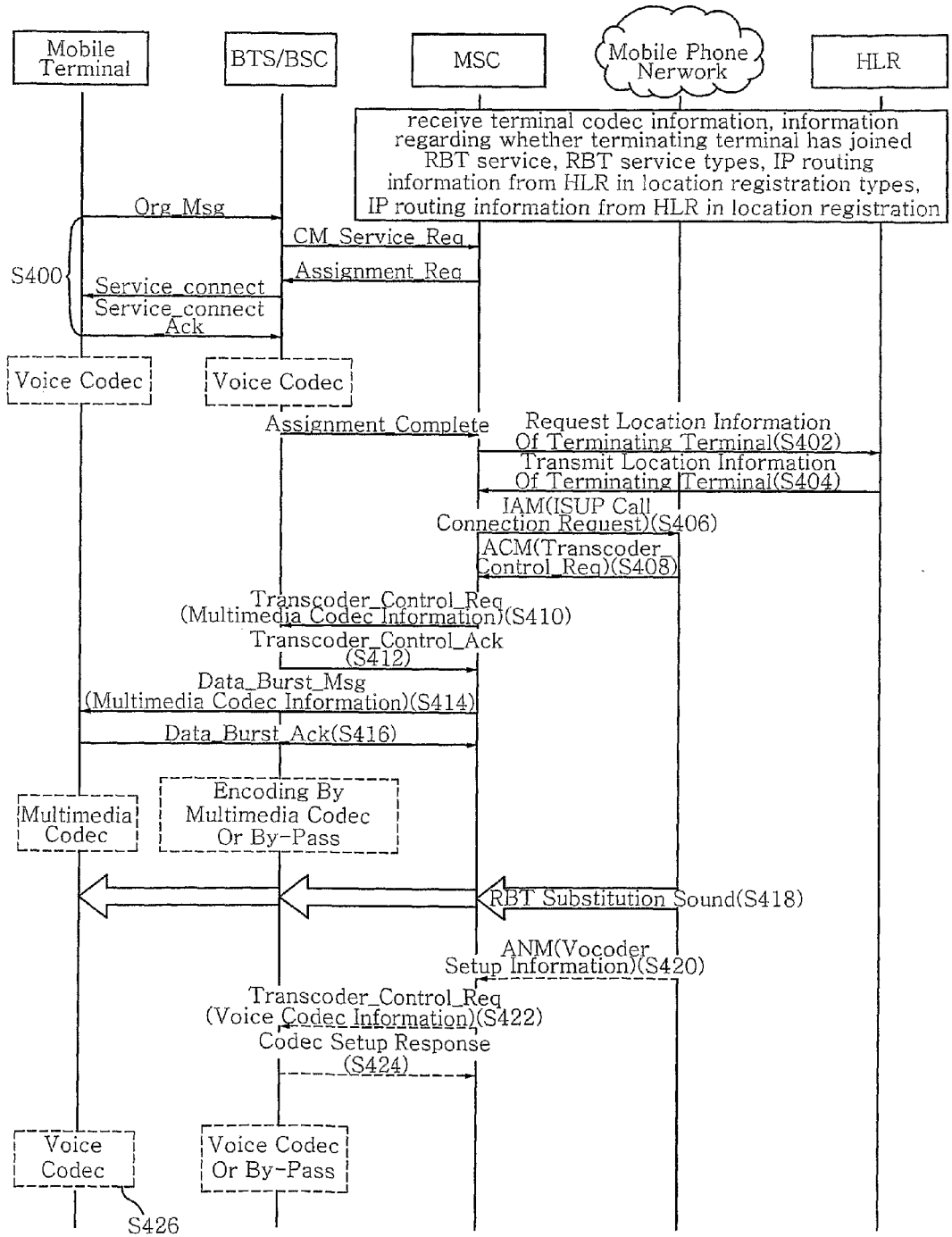
FIG. 4 is a flow diagram illustrating, in detail, a terminal codec setup procedure for a multimedia RBT service according to a preferred embodiment of the present invention.

FIG. 4 is a flow diagram illustrating, in detail, the terminal codec setup procedure for the multimedia RBT service according to a preferred embodiment of the present invention.

The multimedia RBT service according to the preferred embodiment of the present invention is equal to the existing RBT service, excepting that a codec is additionally set for the RBT service before an RBT interval and a voice codec is set again in a change from the RBT interval to a voice communication interval.

Because steps 400, 402, 404 and 406 of FIG. 4 are equal to steps 300, 302, 304 and 306 of FIG. 3, the detailed description will be omitted here. Hereinafter, steps after step 406 will be described.

For the multimedia RBT service, the mobile phone network transmits a first codec setup message to the caller-side switching center 106 before an RBT service interval (S408). The caller-side switching center 106 requests the BSC 104 and the originating terminal 100 to perform codec setup for the multimedia RBT service (S410 and S414). Herein, a message transmitted from the caller-side switching center 106 to the BSC 104 is defined as a second codec setup message, and a message transmitted from the BSC 104 to the originating terminal 100 is defined as a third codec setup message.

Herein, it is preferred to use a message Transcoder_Control_Req defined in an existing interface between the BSC 104 and a mobile phone switching center as the first codec setup message and the second codec setup message. Further, an RBT codec field must be added to the message so that the message can transmit multimedia codec information. Herein, it is preferred to assign 4 bits to the RBT codec field and insert the multimedia codec information into the RBT codec field. However, the scope of the present invention is not limited to this condition.

The BSC 104 sets up a corresponding codec by using the multimedia codec information included in the second codec setup message transferred from the caller-side switching center 106. If the BSC 104 supports the multimedia codec for the multimedia RBT service by hardware, the BSC 104 encodes a corresponding sound source and sets up the codec. However, if the BSC 104 does not support the multimedia codec, it is necessary to bypass the vocoder of the BSC 104 and synchronize the multimedia codec information between the originating terminal 100 and the sound source of the RBT service system.

The caller-side switching center 106 must also request the originating terminal 100 to perform the multimedia codec setup for the multimedia RBT service. For this, the caller-side switching center 106 must transfer the multimedia codec information for the multimedia RBT service to the originating terminal 100. In order to transfer corresponding information to a mobile terminal while minimizing an effect on the current mobile phone system, it is efficient to use a data burst message Data_Burst. Further, the RBT codec field must be added to the data burst message so that the multimedia codec information to be set by the originating terminal 100 can be transmitted. Herein, it is preferred to assign 4 bits to the RBT codec field and insert the multimedia codec information into the RBT codec field. However, the scope of the present invention is not limited to this condition.

When the RBT interval is ended, the caller-side switching center 106 transmits a voice codec setup message to the BSC 104, thereby requesting a change to a voice codec (S422). Herein, it is preferred to use the message Transcoder_Control_Req defined in the existing interface between the BSC 104 and the mobile phone switching center as the voice codec setup message. Further, an RBT codec field must be added to the message so that the message can transmit voice codec information. Herein, it is preferred to assign 4 bits to the RBT codec field and insert the multimedia codec information into the RBT codec field. However, the scope of the present invention is not limited to this condition.

Further, it is also possible to determine the change to the voice codec by using information included in a connection setup message (e.g., an alert message, a connect message) received in a call termination in an existing call procedure, without separately transmitting a message to the terminal. Herein, the voice codec information that must be set by the terminal may include information on a voice codec negotiated in a call origination procedure.

Further, when voice codecs for voice communication of the originating terminal 100 and the terminating terminal coincide with each other, the caller-side switching center 106 controls a corresponding sound source to pass through the caller-side vocoder installed in the BSC 104.

As described above, the present invention proposes a scheme capable of operating a multimedia codec allowing high quality music playback during an RBT interval and operating a voice codec such as an EVRC during voice communication in an RBT service using various types of multimedia codecs, so that a high quality RBT service can be provided. Further, the present invention provides a method and a system for setting up a multimedia codec and a voice codec between a mobile phone system and a terminal in order to provide such a multimedia RBT service, so that it is possible to satisfy customer requirements for a music service and voice communication quality.

Furthermore, according to the present invention, because the quality of an RBT service currently being provided can be improved, a mobile communication provider can create new profits in terms of additional cost for the improved service and improve the satisfaction of customers for a mobile communication service.

While this invention has been described in connection with what is presently considered to be the most practical and preferred embodiment, it is to be understood that the invention is not limited to the disclosed embodiment and the drawings, but, on the contrary, it is intended to cover various modifications and variations within the spirit and scope of the appended claims.

What is claimed is:

1. A method for providing terminal codec setup for use in a multimedia Ring Back Tone (RBT) service, wherein the RBT service allows an RBT sound source previously set in a sound source-providing server by a called subscriber to be reproduced to a caller-side terminal, by using a Home Location Register (HLR) and the sound source-providing server for storing RBT sound sources when a calling subscriber places a call to the called subscriber, the HLR storing profile information including whether the subscriber has is subscribed to the RBT service, the method comprising the steps of:

(a) receiving a first codec setup message including multimedia codec information from a called subscriber-side communication network after a call connection request message including the multimedia codec information is transmitted to the called subscriber-side communication network;

(b) when the first codec setup message is received, transmitting a second codec setup message for requesting setup of a multimedia codec to a caller-side Base Transceiver Station (BTS), to thereby control a caller-side vocoder installed in a caller-side Base Station Controller (BSC) to set up the multimedia codec by using the multimedia codec information included in the second codec setup message;

(c) when the first codec setup message is received, transmitting a third codec setup message for requesting setup of the multimedia codec to the caller-side terminal, to thereby control the caller-side terminal to set up the multimedia codec by using the multimedia codec information included in the third codec setup message; and (d) receiving the RBT sound source selected by using the multimedia codec information from the sound source providing server and transmitting the RBT sound source to the caller-side terminal wherein the multimedia codec is different from a voice codec.

2. The method as claimed in claim 1, further comprising the steps of:

(e) receiving a voice codec setup message for voice communication, with a called-side terminal from a called-side switching center when the call is answered; and (f) transmitting the voice codec setup message to the caller-side BTS, to thereby request a switch-over from the multimedia codec to a voice codec.

3. The method as claimed in claim 2, wherein the caller-side terminal determines the switch-over to the voice codec by using information included in a connection setup message generated when the call is answered.

4. The method as claimed in claim 3, wherein the voice codec is a voice codec negotiated in a call origination procedure.

5. The method as claimed in claim 1, wherein step (b) comprises a sub-step of transmitting a vocoder setup request for the multimedia codec to the caller-side vocoder and controlling the caller-side vocoder to set up the multimedia codec, in case the caller-side vocoder is capable of encoding the RBT sound source by the multimedia codec.

6. The method as claimed in claim 5, wherein the caller-side vocoder encodes the RBT sound source by using the multimedia codec and transmits an encoded sound source to the caller-side terminal, upon receiving the vocoder setup request.

7. The method as claimed in claim 1, wherein step (b) comprises a sub-step of controlling the RBT sound source to bypass the caller-side vocoder and synchronizing the multimedia codec information, when the caller-side vocoder is not capable to encoding the RBT sound source by using the multimedia codec.

8. The method as claimed in claim 1 or 2, wherein each of the first codec setup message, the second codec setup message and the voice codec setup message uses message Transcoder_Control_Req, and an RBT codec field is added to the message Transcoder_Control_Req.

9. The method as claimed in claim 8, wherein the RBT codec field is assigned 4 bits and includes the multimedia codec information.

10. The method as claimed in claim 1 or 2, wherein the third codec setup message uses a data burst message Data_Burst, and an RET codec field is added to the data burst message Data_Burst.

11. The method as claimed in claim 10, wherein the RET codec field is assigned 4 bits and includes the multimedia codec information.

12. The method as claimed in claim 1, wherein the caller-side terminal reproduces the received RBT sound source by using the multimedia codec.

13. A system for providing terminal codec setup for use in a multimedia Ring Back Tone (RET) service, wherein the RBT service allows an RET sound source previously set in a sound source-providing server by a called subscriber to be reproduced to a caller-side terminal, by using a Home Location Register (HLR) and the sound source-providing server for storing RET sound sources when a calling subscriber places a call to the called subscriber, the HLR storing profile information including whether the subscriber is subscribed to the RBT service, the system comprising:

- a caller-side switching center for receiving a first codec setup message including multimedia codec information from a called subscriber-side communication network after a call connection request message including the multimedia codec information is transmitted to the called subscriber-side communication network, transmitting a second codec setup message for requesting setup of the multimedia codec to a caller-side Ease Transceiver Station (BTS) in order to control a caller-side vocoder to set up the multimedia codec by using the multimedia codec information included in the second codec set up message, and transmitting a third codec setup message for requesting setup of the multimedia codec to the called-side terminal in order to control the called-side terminal to set up the multimedia codec by using the multimedia codec information included in the third codec setup message; and
- a caller-side BSC for setting the multimedia codec by using the multimedia codec information included in the second codec setup message when the second codec setup message is received from the caller-side switching center;
- wherein the multimedia codec is different from a voice codec.

14. The system as claimed in claim 13, wherein the caller-side terminal receives a voice codec setup message for voice communication with a called-side terminal from a called-side switching center when the call is answered, and transmits the voice codec setup message to the caller-side BSC, to thereby request a switch-over to a voice codec.

15. The system as claimed in claim 13, wherein, when the call is answered, the caller-side terminal determines the switch-over to the voice codec by using information included in a connection setup message generated when the call is answered.

16. The system as claimed in claim 15, wherein the voice codec is a voice codec negotiated in a call origination procedure.

17. The system as claimed in claim 13, wherein the caller-side switching center transmits a vocoder setup request for the multimedia codec to the caller-side vocoder and controls the caller-side vocoder to set up the multimedia codec, in case the caller-side vocoder is capable of encoding the RT sound source by the multimedia codec.

18. The system as claimed in claim 17, wherein the caller-side vocoder encodes the RBT sound source by using the multimedia codec and transmits an encoded sound source to the caller-side terminal, upon receiving the vocoder setup request.

19. The system as claimed in claim 13, wherein the RBT sound source is controlled to bypass the caller-side vocoder and the multimedia codec information is synchronized, in case the caller-side vocoder is not capable of encoding the RBT sound source by using the multimedia codec.

20. The system as claimed in claim 13 or 14, wherein each of the first codec setup message, the second codec setup message and the voice codec setup message uses message Transcoder_Control_Req. and an RET codec field is added to the message Transcoder_Control_Req.

21. The system as claimed in claim 20, wherein the RBT codec field is assigned 4 bits and includes the multimedia codec information.

22. The system as claimed in claim 13 or 14, wherein the third codec setup message use a data burst message Data_Burst, and an RET codec field is added to the data burst message Data_Burst.

23. The system as claimed in claim 22, wherein the RET codec field is assigned 4 bits and includes the multimedia codec information.

24. The system as claimed in claim 13, wherein the HLR stores information regarding multimedia codecs supported by each terminal subscribed to the multimedia RET service.

* * * * *